(No Model.)
F. P., J., & P. DESBRUÈRES.
MEANS FOR MEASURING PIECE GOODS.
No. 343,303. Patented June 8, 1886.
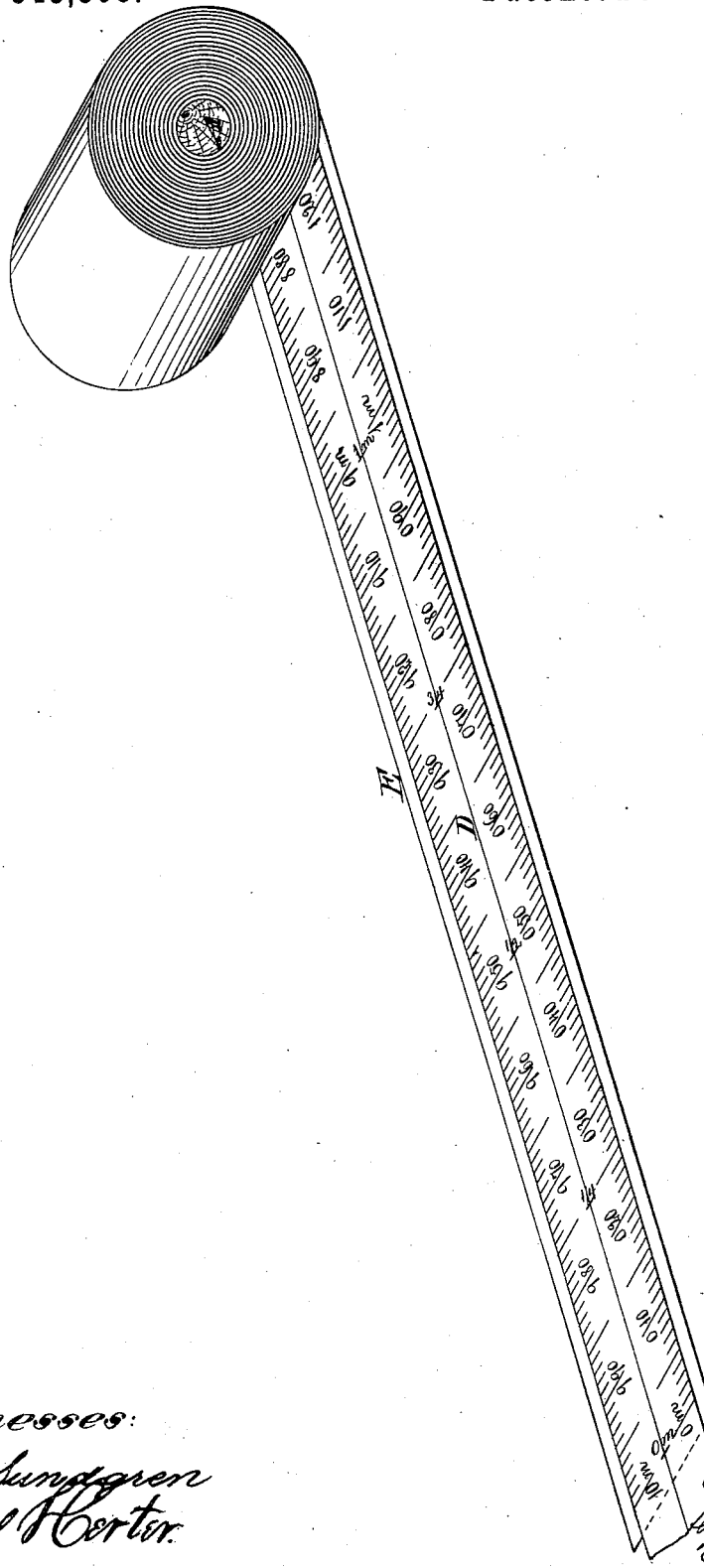

UNITED STATES PATENT OFFICE.

FRANÇOIS PIERRE DESBRUÈRES, JEAN DESBRUÈRES, AND PIERRE DESBRUÈRES, OF PARIS, FRANCE.

MEANS FOR MEASURING PIECE-GOODS.

SPECIFICATION forming part of Letters Patent No. 343,303, dated June 8, 1886.

Application filed July 31, 1884. Serial No. 139,340. (No model.)

*To all whom it may concern:*

Be it known that we, FRANÇOIS PIERRE DESBRUÈRES, JEAN DESBRUÈRES, and PIERRE DESBRUÈRES, citizens of the Republic of France, residing at Paris, in said Republic, have invented a new and useful Improvement in Means for Measuring Woven and other Piece Goods and Fabrics, of which the following is a specification, reference being had to the accompanying drawing.

This invention relates to the method of providing for the measurement of fabrics by attaching or applying to them a strip of paper or other thin material on which is a scale of measurements. When such method is applied to ribbons or other goods which are put up in the form of a roll with the measuring-strip rolled between its coils, a truly scaled or graduated strip does not give a correct measurement, for, because of the greater thickness of the fabric interposed in coils between the coils of the measuring-strip, the fabric has a greater length than the corresponding portion of the measuring-strip.

The object of our invention is to provide for an accurate measurement by means of such a measuring-strip; and to this end it consists in a roll of fabric having rolled up within it a measuring-strip on which the measurements are graduated to compensate for the thickness of the fabric and the difference of length of the measuring-strip and the corresponding portion of the fabric.

The invention further consists in a roll of fabric having rolled up within it a measuring-strip, along the opposite edges of which are measurements compensated, as hereinabove described, and reading in opposite directions, so that one may indicate the measurements of the fabrics cut off and the other the length of fabric remaining in the roll, and having along the middle of its length a normal scale of measurement, by which, when the fabric and the measuring-strip are unrolled and laid out flat, the true measurement may be verified or obtained.

The drawing is a perspective view of a bobbin containing a roll of ribbon partly unrolled having applied to it a measuring-strip which illustrates both features of our invention.

E designates the ribbon.

D designates the measuring-strip, which may be graduated with or have inscribed upon it any scale of measurement, though that which is represented is the metrical scale. The compensated divisions on the two edges of the strip D, which exactly correspond with each other, are represented in centimeters, with indications in numerals every ten centimeters. These corresponding divisions on the two edges, it will be seen, read in opposite directions. The normal measure or scale on the center of the strip might be divided and numbered in the same way; but for the sake of greater distinction we have shown it divided only in quarters of meters.

The degree of compensation in the measures on the edges of the measuring-strip will have to vary for fabrics of different thickness, and will be determined by experiment; but to give an idea of the degree of compensation necessary it may be stated that in rolling a strip of thin paper with a ribbon of ordinary thickness the length of the ribbon will be about one per cent. longer than the paper; hence the divisions on the paper must be one one-hundredth part shorter than the normal measurement. These compensated graduations or measures, printed or inscribed on the edges of the bands of paper and reading in opposite directions, as described, will give, one the length of the ribbon or roll of fabric from the beginning or outer extremity, and the other the length from the end or inner extremity; and it may be understood that if proper care be taken in rolling the fabric and the measuring-strip together, to make their corresponding extremities terminate together, the graduations which have their zero at the beginning or outer extremity furnish exactly the point of the fabric where the cut should be made to detach a determined length, and that the other graduations will indicate exactly the quantity of fabric remaining on the bobbin A, while the normal or true uncompensated graduation on the center of the strip will serve as a measure by which to measure the fabric when unrolled and laid out flat, and hence will serve, whenever required, to verify the truth of the measurement obtained by the compensated graduation or measurement.

We do not claim, broadly, the method of measuring fabrics by rolling up with them a measuring-strip; nor do we claim, broadly, such a measuring-strip having on its opposite edges measurements to read in opposite directions.

What we claim as our invention, and desire to secure by Letters Patent, is—

1. A roll of fabric having rolled up with it and interposed between its coils a measuring-strip on which the measurements are graduated to compensate for the thickness of the fabric and the difference of length between the measuring-strip and the fabric, substantially as herein described.

2. A roll of fabric having rolled up with it and interposed between its coils a measuring-strip, on the opposite edges of which are measurements graduated to compensate for the thickness of the fabric, and reading in opposite directions, and along the middle of which is a normal or true scale of measurement, substantially as herein described.

In testimony whereof we have signed this specification in the presence of two subscribing witnesses.

FRANÇOIS PIERRE DESBRUÈRES.
   JEAN DESBRUÈRES.
   PIERRE DESBRUÈRES.

Witnesses:
 EUG. DUBIN,
 L. COPPIN.